May 25, 1937.  F. J. T. BARNES  2,081,132

MEANS FOR USE IN DRAWING-OFF LIQUIDS FROM CONTAINERS

Filed Feb. 27, 1935  4 Sheets-Sheet 1

F. J. T. Barnes.
INVENTOR

By Stone, Boden & Mack
ATTORNEYS.

May 25, 1937.  F. J. T. BARNES  2,081,132
MEANS FOR USE IN DRAWING-OFF LIQUIDS FROM CONTAINERS
Filed Feb. 27, 1935  4 Sheets-Sheet 2

F. J. T. Barnes.
INVENTOR
By Stone, Boyden & Mack.
ATTORNEYS.

May 25, 1937.　　　F. J. T. BARNES　　　2,081,132
MEANS FOR USE IN DRAWING-OFF LIQUIDS FROM CONTAINERS
Filed Feb. 27, 1935　　　4 Sheets-Sheet 3

F. J. T. Barnes.
INVENTOR
By Stone, Boyden & Mack
ATTORNEYS.

Patented May 25, 1937

2,081,132

UNITED STATES PATENT OFFICE 2,081,132

MEANS FOR USE IN DRAWING OFF LIQUIDS FROM CONTAINERS

Frederick John Trevallon Barnes, Brisbane, Queensland, Australia

Application February 27, 1935, Serial No. 8,547
In Great Britain April 26, 1934

26 Claims. (Cl. 225—42)

This invention is for improvements relating to devices for drawing off liquids from containers, casks and the like, and is applicable, for example, to the drawing off of beer from barrels.

In a beer barrel or cask, a bored metallic bushing is used which is adapted to be inserted into the bilge staves, bung-hole or cantle, this bushing having a flanged head and an externally-threaded body portion. A cork is disposed in the bore of the bush to seal the container. Hitherto, corks used in association with a bush of the kind described have suffered from the disadvantage that there has been a tendency for liquid or gas to escape from the container. This disadvantage was due, inter alia, to the fact that the ordinary cork has proved porous and has not provided an adequate seal against the increasing outward pressures within the container.

One of the objects of the present invention is to provide a cork which will constitute a liquid-tight and gas-tight seal against all pressures, however great, inside the container. A further object of the invention is to provide an arrangement whereby the cork is automatically expelled from the bush into the container when the stem of the tap or the like is inserted into the bush and whereby the cork is retracted into position within the bush when the stem is withdrawn. Other objects of the invention will appear hereinafter.

According to one feature of the present invention, apparatus for drawing off liquids from containers comprises, in combination, a bush to engage a bunghole in the container, a non-porous cork within the bush, a stem (for example, the stem of a tap) adapted to make screw-threaded engagement with the bore of the bush and to expel the cork therefrom, and a resilient sleeve surrounding the stem and engaging at one end with a flange on the stem and at the other end with a flange on the bush, wherein the length of the sleeve is such as to seal the joint between the stem and the bush, when the stem is being screwed into the bush, at a point before the cork has been expelled.

According to another feature of the invention, a cork for use in association with devices for drawing off liquids from containers, is of hollow form, the inner end being open to the liquid within the container when the cork is in position within its surrounding bush, and the cork is closed with a diaphragm or the like of such form that outward pressure on it from within the container tends to expand the cork and thereby increase the tightness of the seal.

According to another feature of the invention a metal stem (for example, a stem of a tap) for making screw-threaded engagement with the bush has an inner extension adapted to engage positively with the outer end of the cork, wherein the cork is thrust out of the bush when the stem is screwed into the bush and is retracted into its sealing position within the bush when the stem is withdrawn. The said extension may be constituted by a nipple which engages with an inwardly directed flange on the outer end of the cork. The nipple is preferably connected to the stem by a neck portion carrying a freely rotatable washer to engage the inner face of the said inwardly directed flange. The purpose of this arrangement will be explained hereinafter.

Other features of the invention will appear hereinafter.

Specific embodiments of the present invention will now be described by way of example, with reference to the accompanying drawings, in which:—

Figure 1:
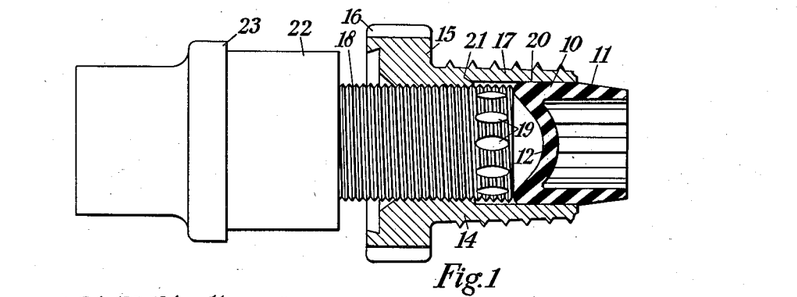
Figure 1 illustrates one form of a rubber cork, according to the invention, with associated parts.
Figure 3:
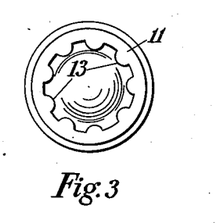
Figure 3 being an end elevation on the line 3—3 of Figure 2.

As shown first in Figure 1, a rubber cork 10 comprises a substantially cylindrical portion having a tapered inner end 11 and a dome-shaped partition 12 which closes its outer end. The internal cylindrical portion of the cork may be provided with reinforcing ribs as shown at 13 in Figure 3, although, in some cases, these may be omitted.

The cork is preferably made of resilient tasteless rubber, but other resilient and non-porous substances could be used.

The metal bush 14 in which the cork seats comprises a flange or head 15 having slots 16 for engagement by a spanner and a body portion 17 which is externally screw-threaded, in known manner, to engage the bung-hole of a barrel or cask. The internal bore of the bush is screw-threaded for part of its length to receive a correspondingly-threaded metal stem 18 which may be the stem or spigot of a tap, and the inner end of the stem is formed with holes 19, described more fully below, through which the liquid passes into the stem and out through the tap. The internal bore of the bush is also formed with a plain portion 20 to co-operate with the outer cylindrical surface of the cork, and it will be seen that between the screw-threaded portion and the plain portion of the bore of the bush there is an annular shoulder 21 which limits the outward movement of the cork in the bush.

When the stem 18 is detached from the bush and the cork is in its sealing position with its outer end abutting against the shoulder 21, as described above, the shoulder prevents longitudinal movement of the cork and any pressure inside the container acts on the inner and convex side of the dome-shaped diaphragm 12 and tends to reduce its curvature. The result of this pressure is to spread the material of the cork radially outwardly into tight engagement with the bore of the bush and the radially-outward pressure increases with the pressure inside the container. In this way an effective seal against the escape of liquid or gas is obtained.

When the stem is to be fitted, it is screwed into the screw-threaded portion of the bush until its inner end engages the outer end of the cork. Further movement of the stem pushes the cork inwardly out of the bush until, finally, it falls into the container, and the holes 19 in the end of the stem are open to the flow of liquid through the stem.

As is more fully explained hereinafter, the stem is surrounded by a rubber sleeve 22 which co-operates with a flange 23 on the stem and with the flange 15 in such manner that, as the stem is screwed up, the sleeve 22 seals the joint between the flange 23 and the flange 15 at a point before the cork 10 is ejected from the bush. Thus, no leakage from the container can take place during the operation of fitting the tap.

A strainer 38, shown in Figures 5 and 6, may be screwed into the bore of the stem 18 to close the inner ends of the holes 19 to a greater or less extent, as will be explained later with reference to Figure 7.

Figure 2:
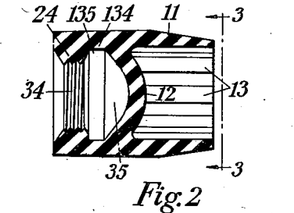
Figure 2 is a sectional view of an alternative form of cork according to the invention.

In the modified form of rubber cork shown in Figure 2, the inner end 11 and the domed partition 12 are similar to the construction already described, but, in addition, the cork is extended forwardly to afford an inwardly-extending flange 24. The space between this flange and the partition 12 is such as to accommodate the metal nipple illustrated in Figure 4.

Figure 4:
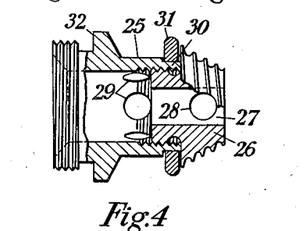
Figure 4 is an elevation, partly in section, of a nipple according to the invention.

The metal nipple comprises a neck portion 25 into which is screw-threaded a tapering portion 26 having external screw-threads, as shown. The tapering portion has an axial bore 27 running through it and holes 28 and 29 are formed in the tapering portion and in the neck respectively, for engagement by a tommy-bar. The outer end of the neck is reduced, as shown at 30, and the reduced portion constitutes the seat for a metal washer 31 having a rounded edge, as shown. The axial width of the washer is less than that of the reduced portion of the neck, so that the washer is free to rotate on the neck even when the tapering portion 26 is screwed right up. The neck 25 is formed integrally with a collar 32 of tapering cross-section.

Figure 7:
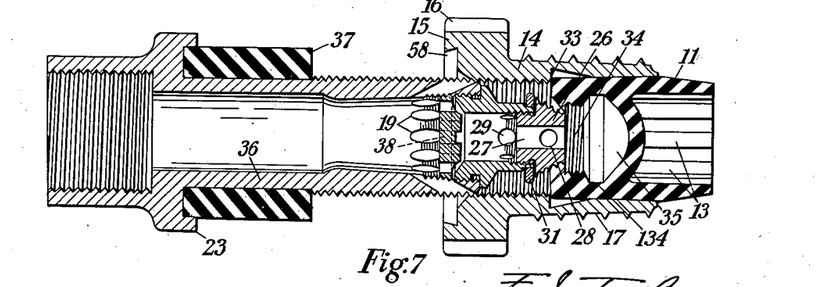
Figure 7 is a sectional elevation of the bush, stem and associated parts, showing the cork of Figure 2 in its sealing position.

Referring now to Figures 4 and 7, the neck portion 25 of the nipple is screw-threaded into the end of the stem with a left-handed thread. The tapering portion 26 is screw-threaded into the neck with a right-handed thread. Figure 7 shows the stem, with the nipple secured to it, the parts being in the position at which the stem is about to be screwed into the bush 14. In this form of the bush a circumferential groove 33 of triangular cross-section is formed in its bore at the location of the outer end of the cork.

If the stem is rotated in a clockwise direction the tapering portion 26 of the nipple immediately engages screw-threads 34 formed on the inner surface of the inwardly extending flange 24 on the cork and, by reason of the tapering formation of the nipple, the flange 24 is expanded during this operation. The outward bending of the wall of the cork, consequent on the expansion aforesaid, is facilitated by a local reduction in the thickness of the wall of the cork, shown at 134 (Figure 2).

When the portion 24 of the cork is forced outwardly into the groove 33, it will be seen that the groove and the rubber interengage so as to prevent longitudinal movement of the cork, so that the cork cannot be forced out of the bush during this part of the operation. As screwing-up of the stem continues the nipple passes through the narrow aperture in the portion 24 and finally the tapering portion and the metal washer 31 lie entirely within the space 35 between the dome 12 and the flange 24. The purpose of the hole 27 is to permit the escape of gas or other fluid from the space 35 in the cork during the operation last above described. The flange 24 now returns to its unstressed position, so that the cork is free to move longitudinally. Moreover, continued rotation of the stem 18 causes the extreme end of the nipple to press against the concave side of the dome-shaped partition 12, with the result that the cylindrical walls of the cork are pulled radially inwards to a slight extent, and the cork can pass freely along the bore of the bush.

Figure 8:
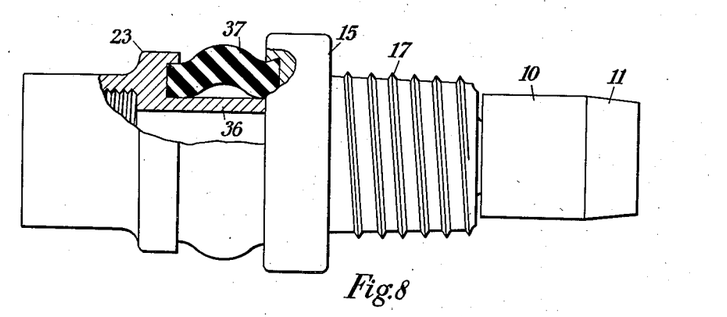
Figure 8 is an elevation corresponding to Figure 7, showing the cork in the position it takes up when the stem has been screwed right into the bush.

As shown in Figure 7, the outer part 36 of the stem 18 is unthreaded and carries a rubber sleeve 37 around it. The flange 23 formed on the stem is grooved to receive the end of the sleeve 37 and the flange 15 of the bush is formed with an under-cut groove 58 to receive the other end of the rubber sleeve. As the screwing-up of the stem proceeds a point is reached when the sleeve 37 is held tightly between the two grooves in the flanges 23 and 15, and the parts are so designed that this point is reached before the cork is expelled from the bush. Further rotation of the stem presses the sleeve 37 into the position shown in Figure 8. This compression does not entail any considerable increase in friction if the parts are first wetted. Finally, the cork reaches the position shown in Figure 8, leaving a space between the cork and the bush through which space liquid can pass into the interior of the bush. The holes 19 at the end of the stem are now at the enlarged bore of the bush so that liquid can flow through them into the stem. Liquid can also pass into the interior of the neck-portion 25 of the nipple both by way of the holes 29 and also by way of the holes 28 and the bore 27; from the interior of the nipple the liquid flows through the strainer 38 into the interior of the stem.

Figure 5:
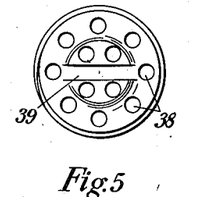
Figures 5 and 6 are an end and side elevation respectively of a strainer for screwing into the stem.
Figure 6:
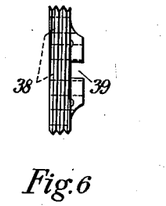

The strainer 38, enlarged views of which are shown as Figures 5 and 6, is screw-threaded into the bore of the stem with the left-handed thread and is provided at 39 with a slot for a screwdriver. As will be seen from Figure 7, by adjusting the position of the strainer 38 the degree of opening of the holes 19 can also be adjusted, and additional straining effect is thus obtained.

The flow of liquid through the stem is normally controlled by a tap or cock (described later) but it will be seen from the foregoing description that the size of the annular orifice between the bush and the cork may be adjusted by rotating the stem to the required extent. The angular position of the stem may also be adjusted, where an ordinary tap is being used, to bring the tap to a suitable angle for manipulation, the sleeve 37 being of such length and resiliency as to accommodate the above adjustments whilst preserving the seal between the stem and the bush.

If now, it is required to remove the stem 18 from the container it is rotated in a counterclockwise direction, whereupon the cork enters the inner end of the bush, and the container is thus sealed at this point whilst the sleeve 37 preserves the seal as above described. Further axial movement of the stem releases the rubber sleeve 37 but not until after the cork has entered the bush. The purpose of the rotatable metal washer 31 on the neck of the nipple is to accommodate the somewhat heavy force between the nipple and the inside of the flange 24 during the retracting operation. Relative rotation thus takes place between the washer and the nipple head and prevents the nipple head from damaging the rubber of the cork. At the same time, the friction between the cork and the nipple cannot unscrew the nipple from the stem owing to the left-handed thread between these parts. When, finally, the cork reaches its original position shown in Figure 7, continued unscrewing of the stem causes the washer to press against the inside of the flange 24, and expand the cork at this region. This expansion is permitted by the groove 33 in the bush as has already been explained. The washer and the nipple head pass through the flange, and the stem is removed from the bush, which is completely sealed, as has already been described, by the cork.

A further advantage of having the screw-thread between the neck 25 and the stem 18 of opposite hand to that between the tapering portion 26 and the neck 25 (see Figure 4) is that it simplifies the operation of dismantling the parts for cleaning. If a tommy-bar is inserted through the portion 28 and turned in a right-handed direction, the neck 25 comes away from the stem. If it is turned in a left-handed direction the tapering part 26 comes away from the neck. When the parts are put together the opposite arrangement of hands prevents the tapering part 26 from being screwed up too tightly.

Figure 9:
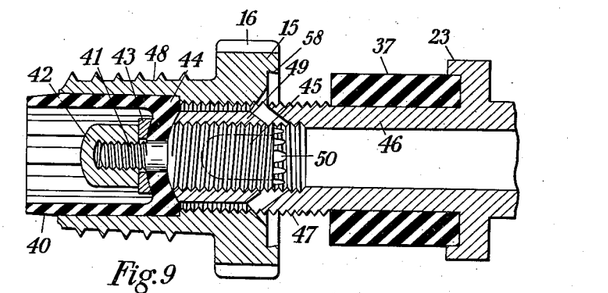
Figure 9 is a sectional elevation of an alternative form of the invention.

As shown now in Figure 9, the cork 40 is secured to a screw-threaded metal portion 41 by means of a nut 42 engaging a washer 43 shaped to conform to the shape of the domed diaphragm 44 of the cork. The screw-threaded portion 41 is formed integrally with an enlarged portion 45 which is furnished with an external left-handed thread.

The stem 46 has the usual externally-threaded portion 47 to engage the internal screw-threads in the bush 48 and is formed with a reduced extension 49 having internal left-handed screw-threads to engage the member 45.

Figure 10:
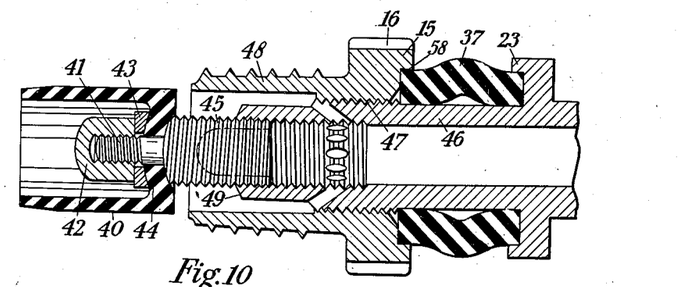
Figure 10 shows the construction of Figure 9 with the parts in a different relative position.

Figure 10 shows all the parts of Figure 9 in a different relative position. When the stem is to be screwed into the bush the extension 49 is first engaged with the portion 45 and rotated in a left-handed direction until the position shown in Figure 9 is reached. The stem 46 is then rotated in a right-handed direction, while endwise pressure is applied to it, until its externally-threaded portion 47 engages with the internal threads in the bush 48. Continued rotation of the stem 46 in a right-handed direction causes the stem to advance into the bush and simultaneously unscrews the extension 49 with respect to the part 45. The cork 40 is therefore advanced into the container at twice the speed of advance of the stem. When, finally, the outer edge of the cork passes beyond the inner edge of the bush 48, the cork is free to rotate and ceases to be unscrewed with respect to the stem. This position is shown in Figure 10 and it will be seen that the stem is open to the flow of liquid into the bush and through the holes 50.

When the stem is to be withdrawn it is rotated in a left-handed direction. The cork rotates with the stem until it is engaged by the bush, whereupon the rotation of the stem tends to screw the part 45 into the extension 49 so that the cork is retracted into the bush at twice the axial speed of withdrawal of the stem. The remainder of the operation will be readily understood from the description, above given, of Figure 9.

Figure 11:
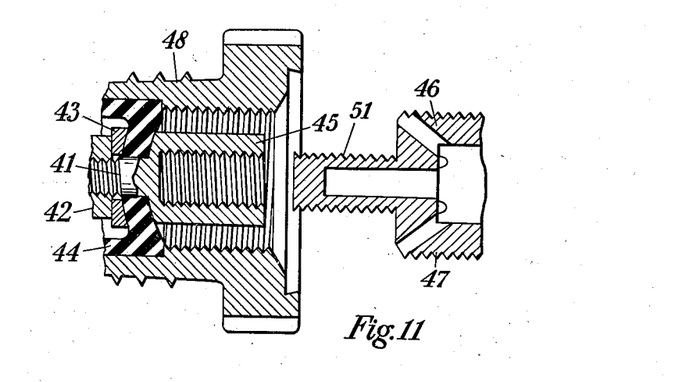
Figure 11 is a modified form of the arrangement shown in Figures 9 and 10.

A modification is shown in Figure 11 in which the stem 46 is furnished with a reduced blind end 51 having a left-handed thread to engage the portion 45 of the cork. The external screw-threads 47 on the stem engage the internal threads in the bush 48 and the action is identical with that already described.

Figure 12:
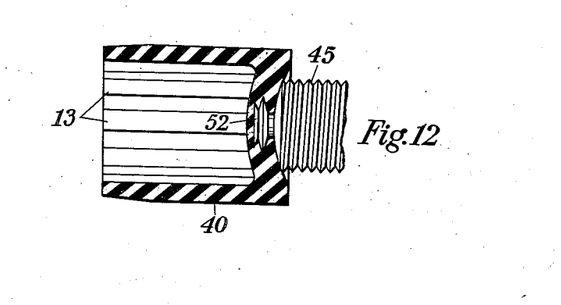
Figure 12 shows an alternative construction of cork for use with the arrangement of Figure 10.

Instead of the screw-threaded metal portion 41 being secured to the rubber by a nut, as described above, the alternative form of assembly shown in Figure 12 may be employed in which the screw-threaded portion 45 is provided with a barbed or other suitably shaped head 52 which is moulded into the dome-shaped diaphragm of the cork.

Figure 13:
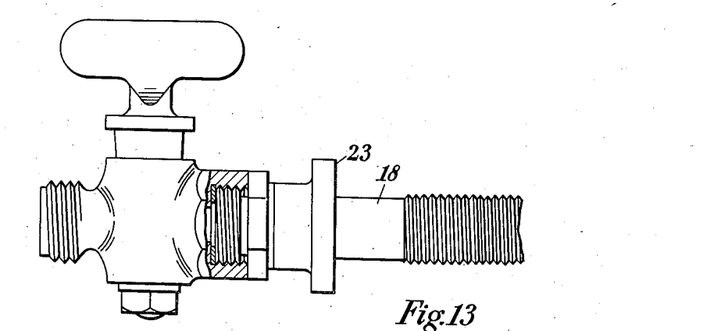
Figure 13 shows the application of the invention to an on-and-off cock.
Figure 14:
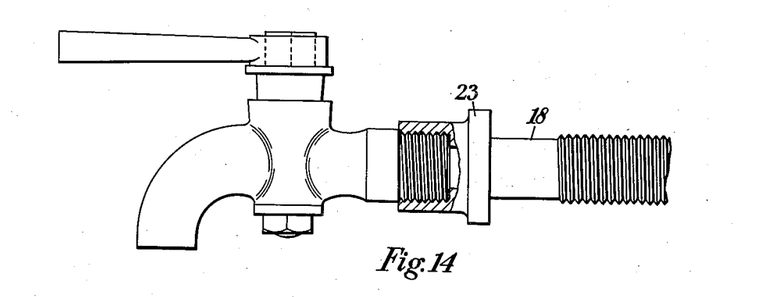
Figure 14 shows the invention applied to an ordinary beer tap.
Figure 15:
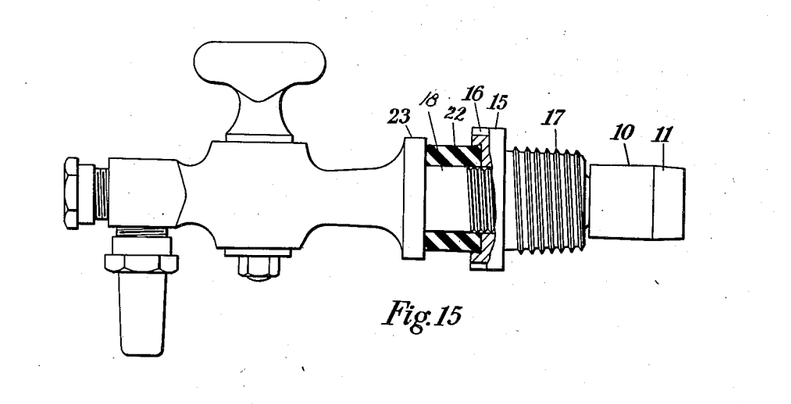
Figure 15 shows a tap designed to incorporate the present invention, whilst
Figure 16:
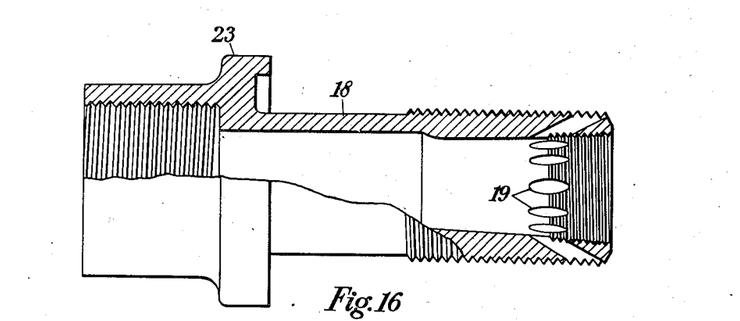
Figure 16 shows a metal stem for use in accordance with the invention.

The stem 18 for use with the present invention is shown separately in Figure 16, and it will be appreciated that it is provided with suitable external and internal screw-threads for the various purposes hereinbefore described. Where the invention is to be applied to an existing device for drawing off liquids from a container, for example, a tap, the stem may take the form of the adapter, shown in Figure 16 having a female union member at the left-hand end to engage the male member of an existing tap. The adapter stem is shown applied to an ordinary beer tap in Figure 14. Figure 13 shows how a male-ended adapter can be applied to an on-and-off cock, to employ the present invention. Figure 15 shows a specially designed beer tap having the necessary stem formed integrally with it.

Although the invention is particularly suitable for application to beer barrels and like containers, it may also be applied to devices for drawing off liquid from containers for acid, or the like, in which case the bushing for the cork would be of glass, porcelain, or other acid-resisting substance.

I claim:

1. A bung hole fitting for liquid containers, comprising a metal bushing having an outer bore of smaller diameter than the inner bore producing an internal abutment shoulder, in combination with a resilient hollow cork having an inwardly domed closed end adapted to abut against said shoulder when the cork is inserted in the inner bore, and the other end of said cork being open to permit entry therein of gas within the container by which the cork is expanded within the bushing.

2. A bung hole fitting for liquid containers, comprising a metal bushing having an outer screw threaded bore of smaller diameter than the inner bore producing an internal abutment shoulder, in combination with a resilient hollow cork having an inwardly domed closed end adapted to abut against said shoulder when the cork is inserted in the inner bore, and the other end of said cork being open to permit entry therein of gas within the container by which the cork is expanded within the bushing.

3. A bung hole fitting for liquid containers comprising a metal bushing having an outer bore of smaller diameter than the inner bore producing an internal abutment shoulder, in combination with a resilient hollow cork having an inwardly domed closed end adapted to abut against said shoulder when the cork is inserted in the inner bore, and the other end of said cork being open to permit entry therein of gas within the container by which the cork is expanded within the bushing, said cork being internally ribbed in the longitudinal direction.

4. A bung hole fitting for liquid containers, comprising a metal bushing having an outer bore of smaller diameter than the inner bore producing an internal abutment shoulder, in combination with a resilient hollow cork open at both ends and having an internal domed partition, one end of said cork abutting against said shoulder and having engaging means for the stem of a tapping device inserted through the outer bore of said bushing, and the other end of said cork being open to permit entry therein of gas within the container by which the cork is expanded within the bushing.

5. A bung hole fitting for liquid containers, comprising a metal bushing having an outer bore of smaller diameter than the inner bore producing an internal abutment shoulder, in combination with a resilient hollow cork open at both ends and having an internal domed partition, one end of said cork abutting against said shoulder and having engaging means for the stem of a tapping device inserted through the outer bore of said bushing, a groove being formed in the inner bore of said bushing adjacent to said shoulder to permit expansion of the end of said cork abutting against said shoulder whilst the stem of a tapping device is entering therein.

6. A bung hole structure for liquid containers, comprising a bushing engaging in a bung hole of the container, a cork located in the inner end of said bushing, said cork being made of non-porous material and being hollow, the hollow space in the interior thereof being directed towards the interior of the container, the outer end of said hollow space being closed by an inwardly domed diaphragm, whereby outward pressure on said diaphragm from within the container tends to expand the outer end of said cork radially and compress same against the inner wall of said bushing.

7. A bung hole structure for liquid containers in combination with a removable tapping device, comprising a bushing engaging in a bung hole of the container and having inner and outer bores separated by a shoulder, a cork located in the inner bore of said bushing so that it may be expelled from said bushing by the end of the stem of the tapping device fitted into the outer bore, said cork being hollow, the hollow interior thereof being open to the interior of the container, the outer end thereof being closed by an inwardly domed diaphragm, and means provided on the end of the stem of said tapping device adapted to engage co-operating means on the outer end of said cork and support said cork within said container beyond the inner end of said bushing when said stem is inserted therethrough.

8. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing.

9. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded.

10. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided.

11. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided.

12. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation.

13. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation.

14. A bung hole structure for liquid containers in combination with a removable tapping device, comprising a bushing engaging in a bung hole of the container, bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being connected to said stem by a neck portion, said neck portion carrying a washer adapted to engage the inner face of the said flange, said washer being freely rotatable on said neck portion whereby friction between the nipple and flange and damage to the flange during the retracting operation are avoided, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation.

15. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation.

16. A bung hole structure for liquid containers in combination with a removable tapping device, comprising a bushing engaging in a bung hole of the container and having inner and outer bores separated by a shoulder, a cork located in the inner bore of said bushing said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, the neck of the nipple being connected to the stem by screw-threads of opposite hand to the screw-threads between the stem and the bushing.

17. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, the neck of the nipple being connected to the stem by screw-threads of opposite hand to the screw-threads between the stem and the bushing.

18. A bung hole structure for liquid containers in combination with a removable tapping device, comprising a bushing engaging in a bung hole of the container and having inner and outer bores separated by a shoulder, a cork located in the inner bore of said bush, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation, the neck of the nipple being connected to the stem by screw-threads of opposite hand to the screw-threads between the stem and the bushing.

19. A bung hole structure for liquid containers in combination with a removable tapping device, comprising a bushing engaging in a bung hole of the container and having inner and outer bores separated by a shoulder, a cork located in the inner bore of said bush, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation, the neck of the nipple being connected to the stem by screw-threads of opposite hand to the screw-threads between the stem and the bushing.

20. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, the neck of the nipple being connected to the stem by screw-threads of opposite hand to the screw-threads between the stem and the bushing, while the nipple and the neck are connected together by a screw-thread of opposite hand to the screw-thread between the neck and the stem.

21. A bung hole structure for liquid containers in combination with a removable tapping device, comprising a bushing engaging in a bung hole of the container and having inner and outer bores separated by a shoulder, a cork located in the inner bore of said bushing said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, the neck of the nipple being connected to the stem by screw-threads of opposite hand to the screw-threads between the stem and the bushing while the nipple and the neck are connected together by a screw-thread of opposite hand to the screw-thread between the neck and the stem.

22. A bung hole structure for liquid containers in combination with a removable tapping device, comprising a bushing engaging in a bung hole of the container and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from said outer bore, to engage behind said flange to support said cork on said stem independently of said bushing, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation, the neck of the nipple being connected to the stem by screw-threads of opposite hand to the screw-threads between the stem and the bushing, while the nipple and the neck are connected together by a screw-thread of opposite hand to the screw-thread between the neck and the stem.

23. A bung hole structure for liquid containers in combination with a removable tapping device, comprising a bushing engaging in a bung hole of the container, and having inner and outer bores separated by a shoulder, a cork located in the inner bore of said bushing, said cork being hollow and open towards the interior of said container, the outer end of said cork being closed by an inwardly domed diaphragm, an inwardly directed flange on the outer end of said cork and a nipple on the end of the stem of said tapping device adapted, when the stem is fitted in said bushing and before the cork is expelled from the outer bore, to engage behind said flange to support said cork on said stem independently of said bushing, said nipple being of tapering form, the external surface of said nipple and the inwardly directed edge of the flange provided on the cork being screw-threaded, said nipple being connected to said stem by a neck portion, said neck portion carrying a washer adapted to engage the inner face of the said flange, said washer being freely rotatable on said neck portion, whereby friction between the nipple and flange and damage to the flange during the retracting operation are avoided, said bushing having an internal groove at the location of the flange provided on the cork when the cork is seated against the shoulder between the bores of the bushing, whereby when the stem is screwed into the bushing the said flange on the cork is expanded by the nipple on the stem and engages in said groove so as to prevent the cork being forced out of the bushing during the first part of the screwing-in operation, the neck of the nipple being connected to the stem by screw-threads of opposite hand to the screw-threads between the stem and the bushing while the nipple and the neck are connected together by a screw-thread of opposite hand to the screw-thread between the neck and the stem.

24. A bung hole structure for liquid containers in combination with a removable tapping device, comprising a bushing engaging in a bung hole of the container and having inner and outer bores separated by a shoulder, a cork located in the inner bore of said bushing so that it may be expelled from said bushing by the end of the stem of the tapping device fitted into the outer bore, said cork being hollow, the hollow interior thereof being open to the interior of the container, the outer end thereof being closed by an inwardly domed diaphragm, a screw-threaded extension on the cork and a co-operating screw-threaded portion on the end of the stem of said tapping device, the screw-threads between the said extension and the stem being of opposite hand to the screw-threads between the stem and the bushing.

25. A bung hole structure for liquid containers in combination with a removable tapping device, comprising a bushing engaging in a bung hole of the container and having inner and outer bores separated by a shoulder, a cork located in the inner bore of said bushing so that it may be expelled from said bushing by the end of the stem of the tapping device fitted into the outer bore, said cork being hollow, the hollow interior thereof being open to the interior of the container, the outer end thereof being closed by an inwardly domed diaphragm, a screw-threaded extension moulded into the cork and a co-operating screw-threaded portion on the end of the stem of said tapping device, the screw-threads between the said extension and the stem being of opposite hand to the screw-threads between the stem and the bushing.

26. A bung hole structure for liquid containers, in combination with a removable tapping device, comprising a bushing engaging in a bung hole of the container and having inner and outer bores separated by a shoulder, a cork located in the inner bore of said bushing so that it may be expelled from said bushing by the end of the stem of the tapping device fitted into the outer bore, said cork being hollow, the hollow interior thereof being open to the interior of the container, the outer end thereof being closed by an inwardly domed diaphragm and means provided on the end of the stem of said tapping device adapted, when the stem is fitted in said bushing and before the cork is expelled from the outer bore, to engage co-operating means on the outer end of said cork and support said cork within said container beyond the inner end of said bushing when said stem is fitted therein, and a resilient sleeve surrounding the stem and located between a flange on the stem and a flange on the bushing, said sleeve being of such length that a seal is formed between the stem and the bushing before the cork is expelled from the bushing, while permitting further screwing-in of the stem into the bushing to carry the cork clear of the inner end of the bushing.

FREDERICK JOHN TREVALLON BARNES.